United States Patent
Resnik et al.

(10) Patent No.: US 6,615,168 B1
(45) Date of Patent: Sep. 2, 2003

(54) MULTILINGUAL AGENT FOR USE IN COMPUTER SYSTEMS

(75) Inventors: Philip Stuart Resnik, Arlington, MA (US); Gary R. Adams, Lexington, MA (US); Robert J. Kuhns, Brookline, MA (US); Mark C. Torrance, Quincy, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1072 days.

(21) Appl. No.: 08/687,886

(22) Filed: Jul. 26, 1996

(51) Int. Cl.$^7$ ............................................. G06F 17/28
(52) U.S. Cl. ..................... 704/8; 704/4; 704/3; 704/1
(58) Field of Search ................. 704/9, 5, 2, 4, 704/7, 6, 3; 707/536, 5

(56) References Cited

U.S. PATENT DOCUMENTS 4,159,536 A * 6/1979 Kehoe et al. .................. 704/2
4,373,192 A * 2/1983 Yanagiuchi et al. ........... 704/6

(List continued on next page.)

OTHER PUBLICATIONS

"Survey on the State of the Art in Human Language Technology," Chapter 8, "Multilinguality," Ronald A. Cole, Editor in Chief, 1996, published on internet at http://www.c-se.ogi.edu/CSLU/HLTsurvey/.

(List continued on next page.)

Primary Examiner—John Leonard Young
(74) Attorney, Agent, or Firm—Rosenthal & Osha L.L.P.

(57) ABSTRACT

A multilingual agent of the present invention assists clients and users of clients in locating, accessing, and understanding documents on servers and also assists servers and providers of servers in making documents on the servers available to clients and users of clients, regardless of the languages in which the documents are written. A networked computer system in which the preferred embodiment of the present invention operates includes a client, a server, and a multilingual agent connected to one another via a network. The multilingual agent includes a document analyzer, a language identifier, a language converter, and a link modifier. In the operation of one aspect of the multilingual agent of the present invention, when the client retrieves a document from the server, the multilingual agent determines whether the document is written in a language that is unfamiliar to the user of the client. If so, the multilingual agent "gists" the document and then provides the client with the "gisted" document. Lastly, the client displays the gisted document to the user of the client. In order to gist the document, the document analyzer breaks the document into pieces, the language identifier identifies a source language in which each piece of the document is written, the language converter converts words or phrases in each piece of the document into equivalent words or phrases in a target language in the gisted document, and the link modifier modifies hypertext links in each piece of the document.

3 Claims, 15 Drawing Sheets

U.S. PATENT DOCUMENTS

| | | | | |
|---|---|---|---|---|
| 4,383,306 A | * | 5/1983 | Morimoto et al. | 704/3 |
| 4,460,973 A | * | 7/1984 | Tanimoto et al. | 704/6 |
| 4,584,667 A | * | 4/1986 | Hashimoto et al. | 704/7 |
| 4,597,055 A | * | 6/1986 | Hashimoto et al. | 704/5 |
| 4,674,066 A | * | 6/1987 | Kucera | 707/5 |
| 5,062,143 A | | 10/1991 | Schmitt | |
| 5,175,684 A | * | 12/1992 | Chong | 704/3 |
| 5,523,946 A | * | 6/1996 | Kaplan et al. | 704/2 |
| 5,583,761 A | * | 12/1996 | Chou | 707/536 |
| 5,612,872 A | * | 3/1997 | Fujita | 704/2 |
| 5,715,466 A | * | 2/1998 | Flanagan et al. | 704/5 |
| 5,721,938 A | * | 2/1998 | Stuckey | 704/4 |
| 5,768,603 A | * | 6/1998 | Brown et al. | 704/9 |

OTHER PUBLICATIONS

"Language Identification: Examining the Issues," Penelope Sibun and Jeffrey Reynar, Fifth Annual Symposium on Document Analysis and Information Retrieval, Apr.15, 1996, University of Nevada, Las Vegas.

"A Polyglot Photocopier," Eric Mankin, University of Southern California Chronicle, Aug. 28, 1995, vol. 15, No. 1.

"Statistical Identification of Language," Ted Dunning, CRL Technical Memo MCCS–94–273, Mar. 10, 1994, Computing Research Laboratory, New Mexico State University, Las Cruces, New Mexico.

* cited by examiner

HEALTH

上西歯科医院, 和歌山県, 日本
第二の永久歯インプラント治療で、入れ歯の悩みを解消します。

コーナーストーン・キャンサー・センター, フロリダ州, アメリカ
患者の治療およびコントロールを総合的かつ進歩的に最新の技術を駆使して行う癌センターです。

[ホーム] [掲載申込み] [ディレクトリ] [NY P ご案内]

All contents Copyright 1994,1995, Nihongo Yellow Pages Inc.

FIG. 10

HEALTH

上西歯科医院,和歌山県, 日本

[jp] ... (Uenishi, Kaminishi) dentistry (doctor's office (surgery), clinic, dispensary) , (Wakayama-ken, prefecture in the Kinki area) , Japan

第二の永久歯インプラント治療で、入れ歯の悩みを解消します。 ordinal (2, two) ... permanent tooth (in, inn) plant medical treatment ... ... (false tooth, denture) ... (trouble, worry, distress) ... (cancellation, liquidation) ... ...

コーナーストーン・キャンサー・センター ... cancer ... center,フロリダ州,アメリカ

... cancer ... center, Florida (state, Shuu, sandbank) , America

患者の治療およびコントロールを進歩的かつ総合的に駆使して最新の技術で行う癌センターです。

... ... ... ... medical treatment ... ... ... ... ... (latest, newest) ... (art, technique, technology) ... cancer patient ... medical treatment ... ... ... ... ... ... (to perform, to do, to conduct oneself) cancer center ... ... ... (order around, use freely) ...

[ホーム] [ home [掲載申込み] [ディレクトリ] [ directory [NY Pご案内]

All contents Copyright 1994, 1995, Nihongo, Yellow Pages Inc.

All pleased Copyright 1994, 1995, Nihongo, Yellow Pages Inc.

FIG. 11

DES PROFESSEURS QUI DISTRIBUENT LES NOTES DE COURS SUR LE WEB

Certains professeurs delaissent de plus en plus le photocopleur et l'affichage. Ceux-cl preferent rendre le syllabus et les notes de cours disponible directement sur le Web afin que les etudiants puissent les telecharger. Cette nouvelle methode permet aux enseignants de fournir davantage d'Informations recentes et facilite les changements de derniere minute, si cela s'avere necessaire. Certains professeurs expliquent que les etudiants passent plus de temps a naviguer pour lire l'information, et soulignent que les presentations technologiques s'inscrivent bien dans les attentes de la generation video. Plusleurs enseignants se sont toutefols montres inquiets face a la violation potentielle du droit d'auteur, et craignent que leurs activites en-ligne ne creent des problemes pour leur ecole. "Les professeurs violent certainement toutes les lois sur le droit d'auteur, les unes apres les autres," declare la vice presidente d'Educom, Carol Twigg, qui prevoit que ces problemes seront resolus avant longtemps. "La prochaine generation de professeurs fera cela tout naturellement." (Chronicle of Higher Education 3 Nov 95 A27)

FIG. 12

DES PROFESSEURS QUI DISTRIBUENT LES NOTES DE COURS SUR LE WEB [fr] of the PROFESSEURS (which, who) distribute the NOTES of (course, run) on the WEB Certains professeurs delaissent de plus en plus le photocopieur et l'affichage. Ceux-ci preferent rendre le syllabus et les notes de cours disponible directement sur le Web afin que les etudiants puissent les telecharger. Cette nouvelle methode permet aux enseignants de fournir davantage d'Informations recentes et facilite les changements de derniere minute, si cela s'avere necessaire. Certains professeurs expliquent que les etudiants passent plus de temps a naviguer pour lire l'information, et soulignent que les presentations technologiques s'inscrivent bien dans les attentes de la generation video. Plusieurs enseignants se sont toutefois montres inquiets face a la violation potentielle du droit d'auteur, et craignent que leurs activites en-ligne ne creent des problemes pour leur ecole. "Les professeurs violent certainement toutes les lois sur le droit d'auteur, les unes apres les autres," declare la vice presidente d'Educom, Carol Twigg, qui prevoit que ces problemes seront resolus avant longtemps. "La prochaine generation de professeurs fera cela tout naturellement."
(Chronicle of Higher Education 3 Nov 95 A27)

Certains professor delaissent of (more, pleased, plus) the photocopieur and l'affichage . those - here preferent (make, yield) the syllabus and the (note, notes) of (course, run) available directement on the Web so that the etudiants can the telecharger. (that, this) new methode permits (in, to the) teaching of furnish any more d'informations recentes and facilitates the change of last minute, if (concealed, that, this) s'avere necessaire. Certains professor explain that the etudiants pass (more, pleased, plus) of time has navigate (for, to) read the information, and soulignent that the presentation technological s'inscrivent well in the (abeyance, attempts, queue) of the generation video. several teaching are (however, nevertheless) (shows, watch) anxious (face, side) has the violation potentielle (from the, of the) right d'auteur, and fear that theirs activities in - line creent of the problemes (for, to) their ecole. the professor (violate, violent) certainement all the law on the right d'auteur, the (a, one) harsh the other, declare the vice presidente d'Educom, Carol Twigg, (which, who) prevoit that these problemes will be resolus before long. the next generation of professor will do (concealed, that, this) all naturally.
(Chronicle of Higher Education 3 Nov 95 A27)

FIG. 13

MULTILINGUAL AGENT FOR USE IN COMPUTER SYSTEMS

FIELD OF THE INVENTION

The present invention relates generally to computer systems and, more particularly, to a multilingual agent for use in computer systems.

BACKGROUND OF THE INVENTION

Networked computer systems enable users to share resources, such as documents. A user at one computer can access a document stored on another computer. The computer using the resources of another computer is typically known as a client, and the computer providing resources to another computer is typically known as a server.

FIG. 1 illustrates a known networked computer system 10. The networked computer system 10 includes a client 12 and a server 14 connected to one another via a network 16. The client 12 and the server 14 may be in the same room or they may be in remote parts of the world. However, the client 12 is still able to access documents on the server 14 via the network 16.

Because the client 12 and the server 14 may be in remote parts of the world, the documents that the client accesses on the server may be written in languages that are unfamiliar to the user of the client. Therefore, a need exists for mechanisms that enable users of clients to access and understand documents on servers, regardless of the languages in which the documents are written.

In addition, networked computer systems include programs that enable users to locate resources, such as documents. These programs provide indexing and searching capabilities so that the user of the client 12 can locate documents on the server 14 and other servers. If the documents on the servers are written in different languages, problems can arise in attempting to index and search for the documents. Therefore, a need also exists for mechanisms that enable servers to make documents on the servers available to users of clients and that enable users of clients to locate documents on servers, regardless of the languages in which the documents are written.

SUMMARY OF THE INVENTION

The preferred embodiment of the present invention provides a multilingual agent for use in computer systems. The multilingual agent assists clients and users of clients in locating, accessing, and understanding documents on servers, regardless of the languages in which the documents are written. The multilingual agent also assists servers and providers of servers in making documents on the servers available to clients and users of clients, again, regardless of the languages in which the documents are written.

A networked computer system in which the preferred embodiment of the present invention operates includes a client, a server, and a multilingual agent connected to one another via a network. The multilingual agent includes a document analyzer, a language identifier, a language converter, and a link modifier.

In the operation of one aspect of the multilingual agent of the present invention, when the client retrieves a document from the server, the multilingual agent determines whether the document is written in a language that is unfamiliar to the user of the client. If the document is written in a language that is unfamiliar to the user of the client, the multilingual agent "gists" the document. The multilingual agent then provides the client with the "gisted" document. Lastly, the client displays the gisted document to the user of the client.

In order to gist the document, the document analyzer of the multilingual agent breaks the document into pieces. For each piece of the document, the language identifier of the multilingual agent identifies a source language in which the piece of the document is written. Using the identified source language for each piece of the document, the language converter of the multilingual agent converts words or phrases in the piece of the document into equivalent words or phrases in a target language in the gisted document. Additionally, the link modifier of the multilingual agent modifies hypertext links in each piece of the document.

BRIEF DESCRIPTION OF THE DRAWINGS

FIG. 10 is a document written in Japanese that a client retrieved from a server;

FIG. 11 is a gisted document corresponding to the document of FIG. 10 after operation of the multilingual agent of FIG. 3;

FIG. 12 is a document written in French that a client retrieved from a server;

FIG. 13 is a gisted document corresponding to the document of FIG. 12 after operation of the multilingual agent of FIG. 3;

DETAILED DESCRIPTION OF THE PREFERRED EMBODIMENT

The preferred embodiment of the present invention provides a multilingual agent for use in computer systems. The multilingual agent assists clients and users of clients in locating, accessing, and understanding documents on servers, regardless of the languages in which the documents are written. The multilingual agent also assists servers and providers of server in making documents on the servers available to clients and users of clients, again, regardless of the languages in which the documents are written.

Figure 1:
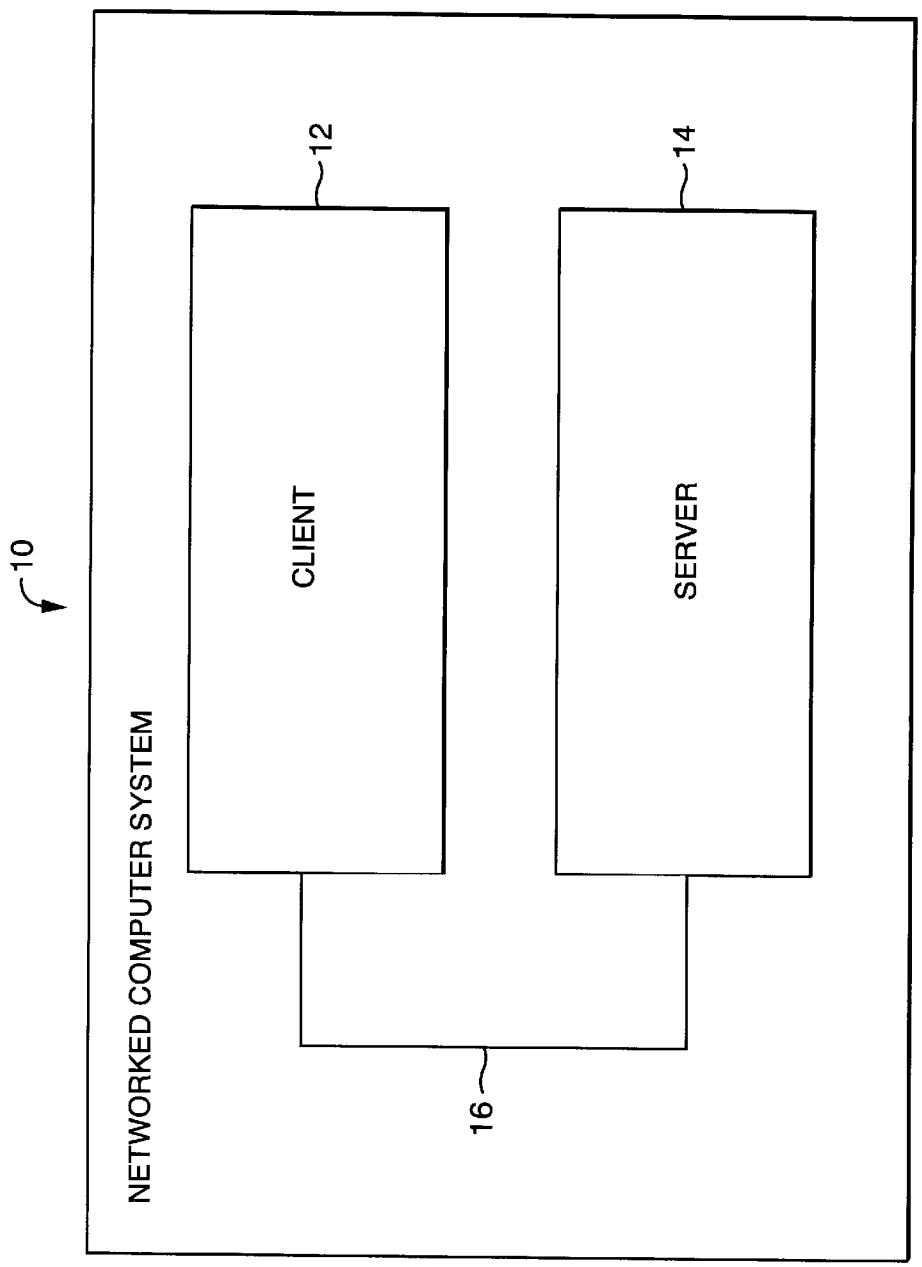
FIG. 1 is a block diagram illustrating the components of a known networked computer system.
Figure 2:
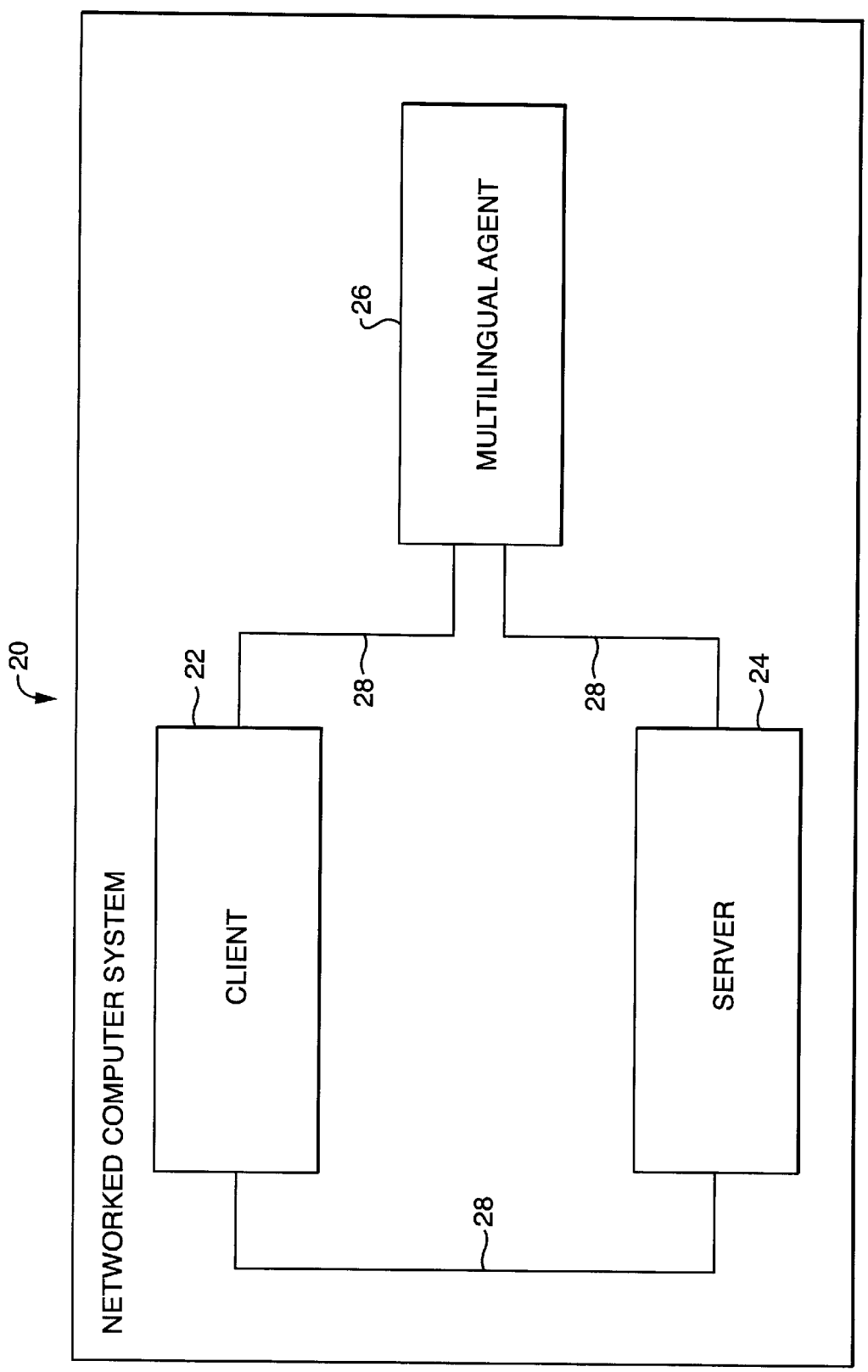
FIG. 2 is a block diagram illustrating the components of a networked computer system in which the preferred embodiment of the present invention operates.

A networked computer system 20 in which the preferred embodiment of the present invention operates is illustrated in FIG. 2. The networked computer system 20 includes a client 22, a server 24, and a multilingual agent 26. The client 22 is any computer requesting services (such as access to documents), and the server 24 is any computer providing services. The multilingual agent 26 assists clients and servers, such as the client 22 and the server 24, and their users and providers. The multilingual agent 26 may run on the client 22, on the server 24, or on a separate computer. In FIG. 2, the multilingual agent 26 is shown as running on a separate computer. The client 22, the server 24, and the computer on which the multilingual agent 26 is running (if it is running on a separate computer) are connected to one another via a network 28.

The client 22 and the server 24 typically include a central processing unit and storage (not separately shown). Additionally, the client 22 and the server 24 typically are connected to any number of input/output ("I/O") devices, such as monitors, keyboards, printing devices, and storage devices (not separately shown). These components of the client 22 and the server 24 are well-known in the art and will not be discussed in greater detail.

For the sake of simplicity, the networked computer system 20 of the present invention has been illustrated with a single client 22 and a single server 24. However, one of ordinary skill in the art will appreciate that the networked computer system 20 could include any number of clients and any number of servers (and typically, would include a multiple number of clients and a multiple number of servers). Each additional client and server would be connected to the others via the network 28 and would include components similar to those discussed above in connection with the client 22 and the server 24.

Figure 3:
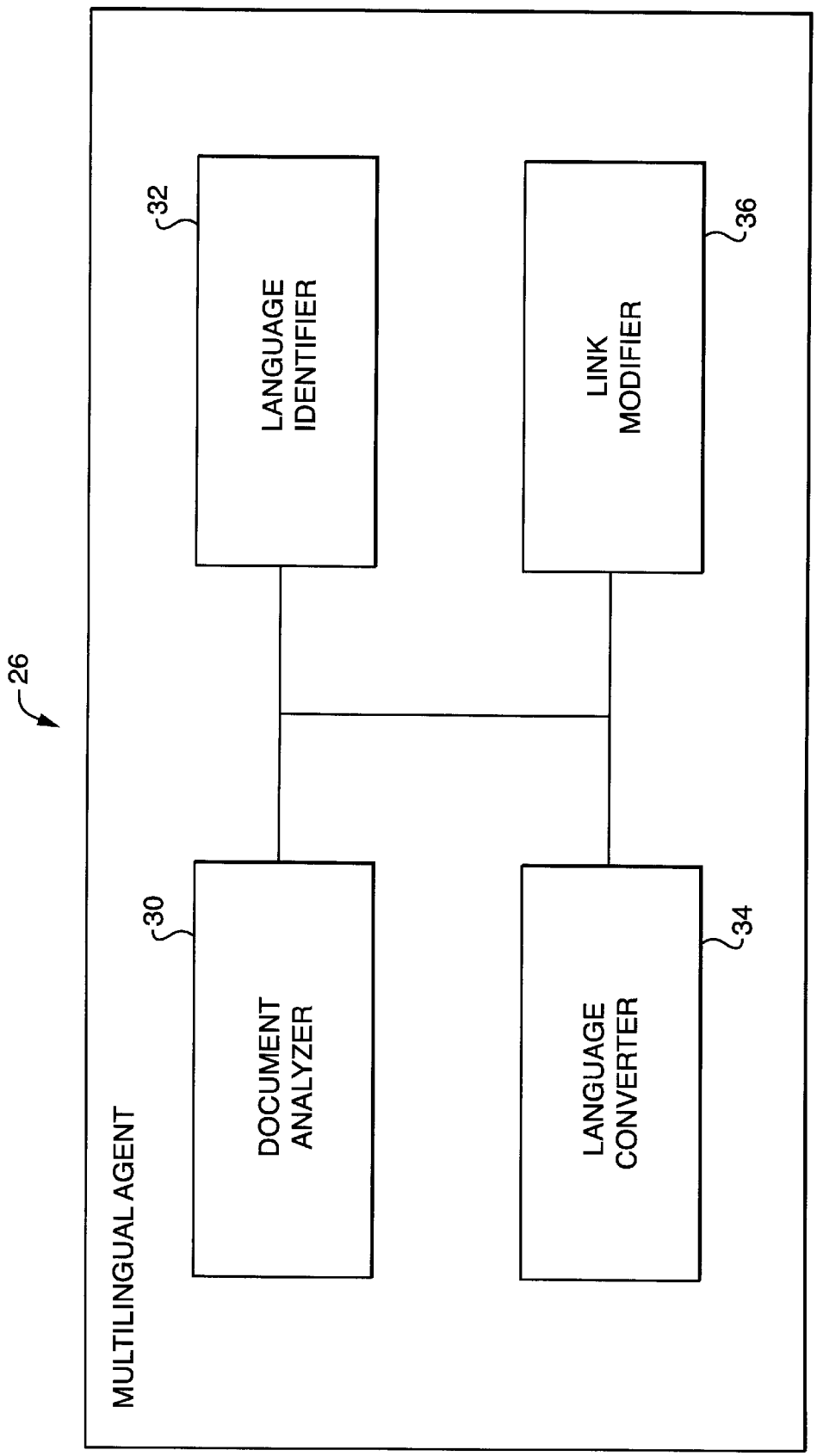
FIG. 3 is a block diagram illustrating in greater detail a multilingual agent component of the networked computer system of FIG. 2.

The multilingual agent 26 is illustrated in greater detail in FIG. 3. The multilingual agent 26 includes a document analyzer 30, a language identifier 32, a language converter 34, and a link modifier 36. The function of each of these components of the multilingual agent 26 will be described in detail below.

Figure 4:
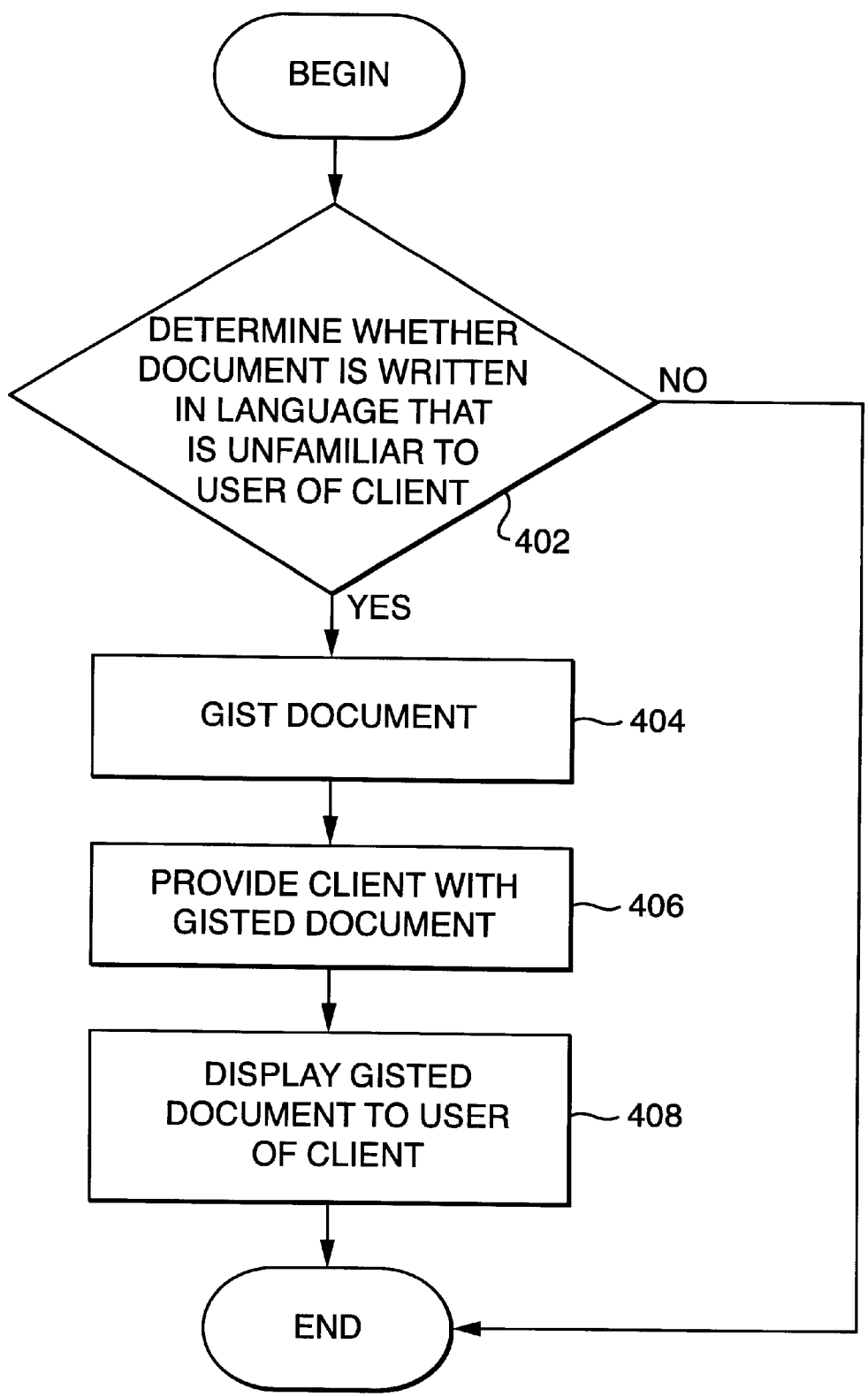
FIG. 4 is a flowchart generally illustrating the preferred steps performed in the operation of one aspect of the multilingual agent of FIG. 3.

As described above, one aspect of the multilingual agent of the present invention assists clients and users of clients in accessing and understanding documents on servers, regardless of the languages in which the documents are written. FIG. 4 generally illustrates the preferred steps performed in the operation of this aspect of the multilingual agent 26 of the present invention. Initially, when the client 22 retrieves a document from the server 24, the multilingual agent 26 determines whether the document is written in a language that is unfamiliar to the user of the client (step 402). If the document is written in a language that is unfamiliar to the user of the client 22, the multilingual agent 26 "gists" the document (step 404). The multilingual agent 26 then provides the client 22 with the "gisted" document (step 406). Lastly, the client 22 displays the gisted document to the user of the client (step 408). As used herein, "gisting" a document includes various steps that convert a document based on the language in which the document is written and a desired language for the document. The step of gisting a document will be described in greater detail below in connection with FIGS. 5–9.

In a preferred embodiment of the present invention, the client 22 and the server 24 are connected to the Internet and are accessing resources (such as documents) through the Internet. The Internet is a worldwide network in which computers connected to the network communicate using protocols, such as a Transfer Control Protocol ("TCP") and an Internet Protocol ("IP"), collectively referred to as "TCP/IP."

More specifically, in a preferred embodiment of the present invention, the client 22 and the server 24 are part of the World Wide Web ("Web," "WWW," or "W3") and are accessing resources (such as documents) through the World Wide Web. The World Wide Web is a system on the Internet for locating and accessing resources, such as documents. Computers that are part of the World Wide Web communicate using a HyperText Transfer Protocol ("HTTP"). Documents in the World Wide Web are written using a HyperText Markup Language ("HTML") and are commonly referred to as "HTML documents" or "pages." Programs that can read and present HTML documents are commonly referred to as "browsers."

HTML documents include "markup elements" to specify the logical structure of the documents. A markup element includes a start "markup tag" and, if necessary, the text or image affected by the markup tag and an end markup tag. The markup element may also include other information when necessary, such as an address or attribute information. Example markup elements include heading elements, list elements, table elements, paragraph elements, bold elements, italics elements, size elements, and anchor elements (anchor elements will be described in greater detail below). Additionally, HTML documents include character or entity references. Character or entity references are used to display characters that have a special meaning in HTML, such as angle brackets.

A key feature of HTML documents is that they can include "hypertext." A hypertext document is a document that includes pointers or links to other documents. These pointers or links are commonly referred to as "hypertext links." HTML documents include a markup element to indicate a hypertext link. This markup element includes the address of the document to which the hypertext link points and the text or image associated with the hypertext link. The hypertext link markup element is commonly referred to as an "anchor element" and the text or image associated with the hypertext link is commonly referred to as a "hypertext anchor." The address of the document to which the hypertext link points is specified as a Uniform Resource Locator ("URL").

When an HTML document is displayed, the hypertext anchor is typically displayed differently than the rest of the text in the document (e.g., the hypertext anchor is displayed with an underline and/or in a different color). If a user selects the hypertext anchor (e.g., by clicking a mouse while a cursor is over the hypertext anchor), the browser retrieves the document at the address specified in the anchor element.

As stated above, in a preferred embodiment of the present invention, the documents are HTML documents. Therefore, for ease of reference in discussing FIGS. 5–13, the step of gisting a document will be described with regard to the details of gisting an HTML document. However, one of ordinary skill in the art will appreciate that the documents could be any documents, regardless of whether the documents are accessed through a network and regardless of whether the documents are HTML documents. Moreover, as used herein, the term document includes any text on a computer system, regardless of whether the text is only part of a document and regardless of whether the text is statically stored on the computer system or is dynamically created or generated during operation of the computer system.

Further, in a preferred embodiment of the present invention, when the client 22 retrieves a document from the server 24, the multilingual agent 26 determines whether the document is written in a language that is unfamiliar to the user of the client and, if so, gists the document (as generally described above in connection with FIG. 4). These steps occur automatically without any initiative on the part of the user of the client 22 or the computer on which the multilingual agent 26 is running. The multilingual agent 26 is initiated once (such as when the computer on which the multilingual agent is running is started up) and then continues to run and gist documents as necessary when the documents are retrieved.

In another embodiment of the present invention, the user of the client 22 initiates the multilingual agent 26 when the client retrieves a document that is written in a language that is unfamiliar to the user of the client. The user of the client 22 could initiate the multilingual agent 26 in a variety of ways. For example, the user of the client 22 could instruct a browser to call the multilingual agent 26 through a command line. Alternatively, the multilingual agent 26 could be an extension to a browser. An option in this multilingual agent browser extension would include gisting a document. When the user of the client 22 selects this option, the browser would call the multilingual agent 26.

In still another embodiment of the present invention, the multilingual agent 26 is a proxy server. A proxy server is an intermediary server through which a client and other servers communicate. An option in many browsers allows the user of the client to specify a proxy server. Once the user of the client specifies a proxy server, the browser directs any request for a document from another server through the proxy server. The proxy server then retrieves the document from the other server and provides the client with the document. When the multilingual agent 26 is the proxy server, the multilingual agent retrieves the document from the other server and then determines whether the document is written in a language that is unfamiliar to the user of the client 22. If the document is written in a language that is unfamiliar to the user of the client 22, the multilingual agent 26 gists the document and then displays the gisted document to the user of the client 22.

In some of the embodiments described above, the multilingual agent 26 determines whether the document is written in a language that is unfamiliar to the user of the client 22 and, if so, gists the document (as opposed to the user of the client making this determination and initiating the multilingual agent when necessary). In the embodiments in which the multilingual agent 26 makes this determination, the multilingual agent has knowledge regarding the languages that are familiar to the user of the client. Moreover, the multilingual agent 26 may have knowledge regarding the degree of familiarity that the user has with each language (e.g., very familiar, somewhat familiar, unfamiliar). The multilingual agent 26 uses this knowledge to determine whether to gist the document. Further, depending on the degree of familiarity that the user has with the language, the multilingual agent 26 could use this knowledge to determine how much of the document to gist (e.g., only gist uncommon words, only gist words in a certain topic area).

Figure 5:
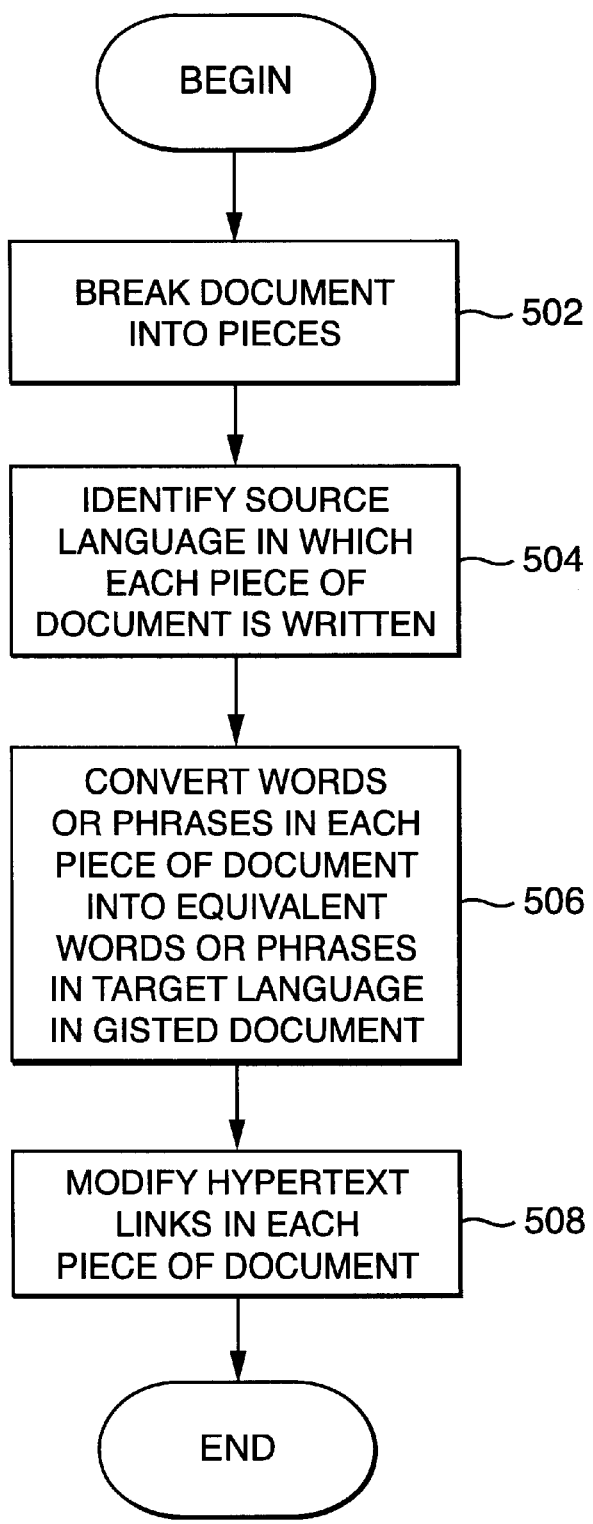
FIG. 5 is a flowchart illustrating in greater detail the preferred step of gisting a document, as generally illustrated in FIG. 4.

FIG. 5 illustrates the preferred step of gisting a document (step 404) in greater detail. Initially, the document analyzer 30 of the multilingual agent 26 breaks the document into pieces (step 502). For each piece of the document, the language identifier 32 of the multilingual agent 26 identifies a source language in which the piece of the document is written (step 504). Using the identified source language for each piece of the document, the language converter 34 of the multilingual agent 26 converts words or phrases in the piece of the document into equivalent words or phrases in a target language in the gisted document (step 506). Additionally, the link modifier 36 of the multilingual agent 26 modifies hypertext links in each piece of the document (step 508).

In a preferred embodiment of the present invention, the multilingual agent 26 has knowledge regarding the desired target language for the user of the client 22. In another embodiment of the present invention, the multilingual agent has a default target language. Further, in the embodiment of the present invention in which the user of the client 22 initiates the multilingual agent 26, the user of the client could specify the desired target language when the multilingual agent is initiated.

As described above, in a preferred embodiment of the present invention, the step of gisting a document includes breaking the document into pieces and then performing various operations on the pieces of the document. A document may include one or more pieces. One of ordinary skill in the art will appreciate that the various operations that are performed on the pieces of the document could be performed on the document as a whole without breaking the document into pieces. Alternatively, one of ordinary skill in the art will appreciate that the various operations could be performed only on certain pieces of the document, such as headings. In this case, the pieces could be specified by the user of the client 22.

Figure 6:
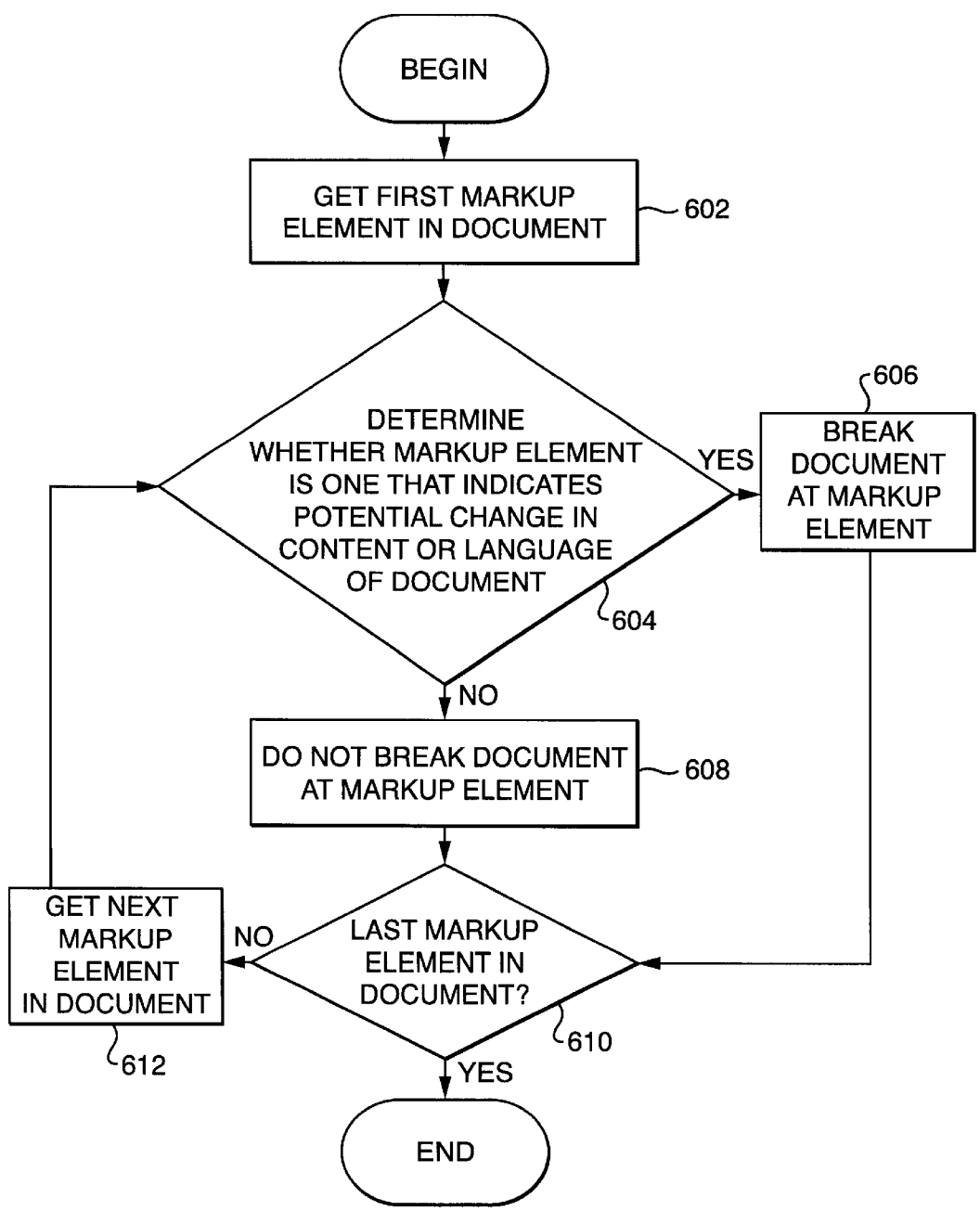
FIG. 6 is a flowchart illustrating in greater detail the preferred step of breaking a document into pieces, as generally illustrated in FIG. 5.

FIG. 6 illustrates the preferred step of breaking a document into pieces (step 502) in greater detail. As described above, HTML documents include markup elements to specify the logical structure of the documents. Generally, the document analyzer 30 determines whether to break the document at each markup element in the document. This decision is based on the type of the markup element. For example, as also described above, markup elements include heading elements, list elements, table elements, paragraph elements, bold elements, italics elements, size elements, and anchor elements. The document analyzer 30 breaks the document at markup elements that indicate a potential change in the content or the language of the document, such as at heading elements, list elements, table elements, and paragraph elements. The document analyzer 30 does not break the document at markup elements that do not indicate a potential change in the content or the language of the document, such as at bold elements, italics elements, size elements, and anchor elements.

Starting with a first markup element in the document (step 602), the document analyzer 30 determines whether the markup element is one that indicates a potential change in the content or language of the document (step 604). If the markup element is one that indicates a potential change in the content or language of the document, the document analyzer 30 breaks the document at the markup element (step 606). Otherwise, the document analyzer 30 does not break the document at the markup element (step 608). These steps are repeated for each markup element in the document (steps 610–612).

Figure 7:
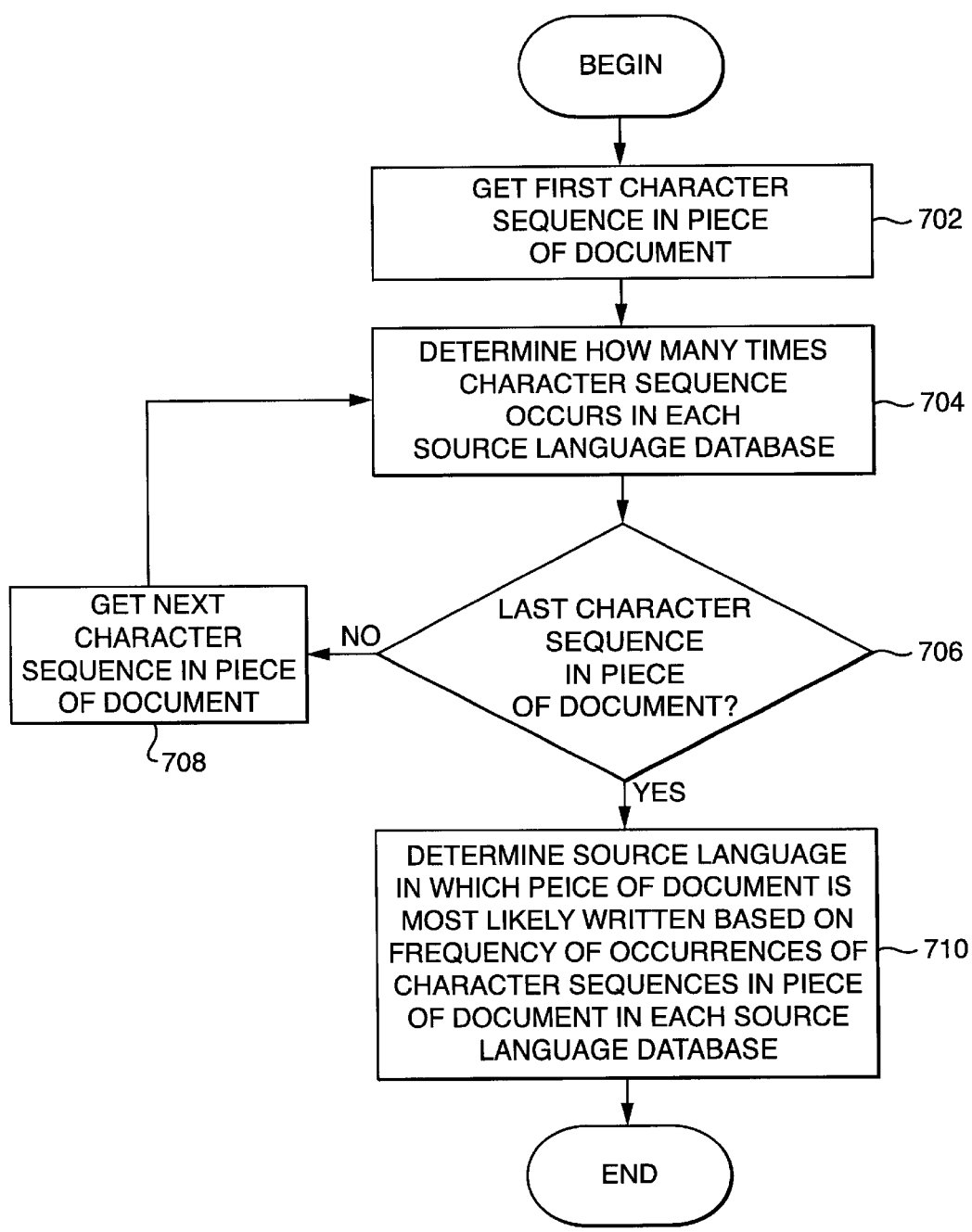
FIG. 7 is a flowchart illustrating in greater detail the preferred step of identifying a source language in which a piece of a document is written, as generally illustrated in FIG. 5.

FIG. 7 illustrates the preferred step of identifying a source language in which a piece of a document is written (step 504) in greater detail. Before operation of the language identifier 32, databases are generated indicating the frequency of certain character sequences in the source languages. A database is generated for each potential source language. In order to generate these databases, documents in each source language are analyzed for the character sequences that occur in the documents. The databases include these character sequences and their frequency in each source language. Generally, the language identifier 32 determines how many times each character sequence in a piece of the document occurs in each source language database and then determines the source language in which the piece of the document is most likely written based on the frequency of the occurrences of the character sequences in the piece of the document in each source language database.

Starting with a first character sequence in a piece of the document (step 702), the language identifier 32 determines how many times the character sequence occurs in each source language database (step 704). This step is repeated for each character sequence in the piece of the document (steps 706–708). Then, the language identifier 32 determines the source language in which the piece of the document is most likely written based on the frequency of the occurrences of the character sequences in the piece of the document in each source language database (step 710). This process is repeated for each piece of the document.

Some computer systems enable users to label documents or pieces of documents with information regarding the language in which the document or the piece of the document is written. If a document or a piece of a document is labelled with this type of information, the preferred step of identifying a source language in which a piece of a document is written (step 504) simply involves examining this information to identify the source language.

Figure 8:
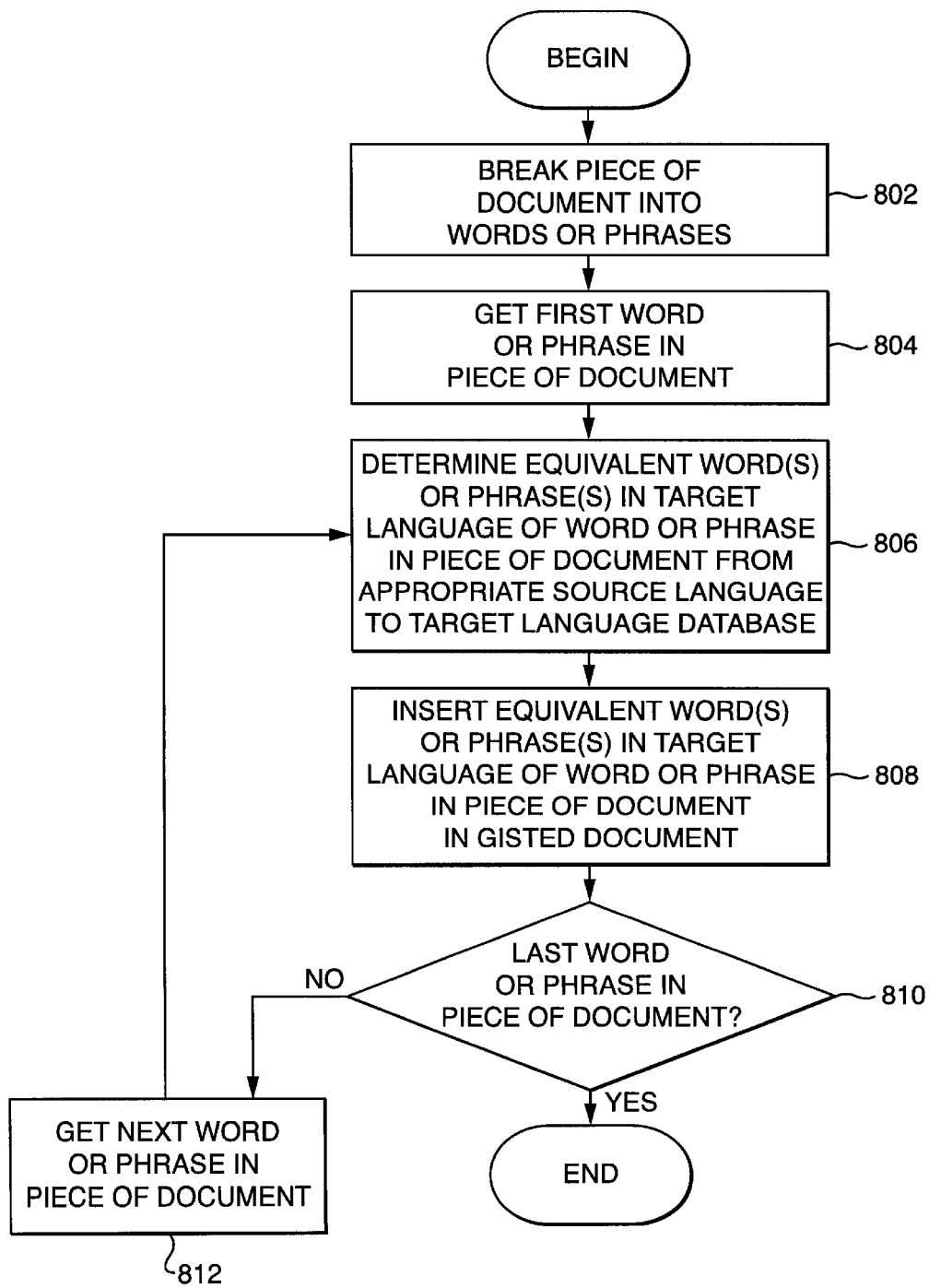
FIG. 8 is a flowchart illustrating in greater detail the preferred step of converting words or phrases in a piece of a document into equivalent words or phrases in a target language in a gisted document, as generally illustrated in FIG. 5.

FIG. 8 illustrates the preferred step of converting words or phrases in a piece of a document into equivalent words or phrases in a target language in a gisted document (step 506) in greater detail. Before operation of the language converter 34, databases are generated mapping words or phrases in the source languages to equivalent words or phrases in the target languages. A database is generated for each potential source language to target language combination. The database for each combination includes words or phrases in the source language and their equivalent words or phrases in the target language. Additionally, databases are generated listing words or phrases in the target languages. A database is generated for each potential target language. Generally, the language converter 34 breaks a piece of the document into words or phrases, determines the equivalent word(s) or phrase(s) in the target language of each word or phrase in the piece of the document, and then inserts the equivalent word(s) or phrase(s) in the target language for each word or phrase in the piece of the document in the gisted document.

Initially, the language converter 34 breaks a piece of the document into words or phrases (step 802). The step of breaking a document (or a piece of a document) into words or phrases is known as word segmentation. With certain languages (such as English), the language converter 34 accomplishes this step by searching for typical word delimiters, such as white space and certain punctuation, and breaking the piece of the document at these delimiters. With other languages (such as Japanese), this step requires a more complex approach involving pattern recognition and grammatical heuristics. Word segmentation is well-known in the art and will not be described in greater detail.

Next, starting with a first word or phrase in the piece of the document (step 804), the language converter 34 determines the equivalent word(s) or phrase(s) in the target language of the word or phrase in the piece of the document from the appropriate source language to target language database (step 806). The language converter 34 then inserts the equivalent word(s) or phrase(s) in the target language for the word or phrase in the piece of the document in the gisted document (step 808). These steps are repeated for each word or phrase in the piece of the document (steps 810–812). This process is repeated for each piece of the document.

If a word or phrase in a piece of the document is not found in the appropriate source language to target language database, the language converter 34 normalizes the word or phrase and then determines the equivalent word(s) or phrase(s) in the target language of the normalized word or phrase (again, from the appropriate source language to target language database). Many techniques can be used to normalize a word or phrase. For example, normalization of a word may involve changing upper case letters in the word to lower case, removing a suffix from the word, breaking the word into two or more pieces, or restoring accents in the word. The purpose of normalization is to place the word or phrase in the form in which it is stored and thus, will be found, in the source language to target language database. This step may be repeated for different normalizations or variations of the word or phrase.

If a word or phrase in a piece of the document is not found, and none of its normalizations or variations are found, in the appropriate source language to target language database, the language converter 34 may take other steps in an attempt to determine the equivalent word(s) or phrase(s) in the target language of the word or phrase in the piece of the document. For example, the language converter 34 may determine whether the word or phrase is listed in the appropriate target language database (and, thus, is already in the target language).

If all attempts to determine the equivalent word(s) or phrase(s) in the target language of a word or phrase in a piece of the document fail, the language converter 34 inserts an indication of the omission of an equivalent word(s) or phrase(s) in the target language for the word or phrase in the piece of the document in the gisted document. For example, the language converter 34 may insert the word or phrase in the piece of the document itself, an ellipsis, or a phonetic or transliterated string in the gisted document. The decision whether to insert the word or phrase in the piece of the document or some alternative (such as an ellipsis or a phonetic or transliterated string) depends on the similarity between the source language and the target language.

If the source and target languages are similar, the insertion of the word or phrase in the piece of the document in the gisted document may help the user better understand the gisted document. For example, if the source language is French and the target language is English, the insertion of the word or phrase in the piece of the document (in French) in the gisted document may help the user better understand the gisted document (in English). Thus, the word or phrase in the piece of the document (in French) would be inserted in the gisted document. However, if the source and target languages are not similar, the insertion of the word or phrase in the piece of the document in the gisted document is not likely to help the user better understand the gisted document. For example, if the source language is Japanese and the target language is English, the insertion of the word or phrase in the piece of the document (in Japanese) in the gisted document is not likely to help the user better understand the gisted document (in English). Thus, an ellipsis would be inserted in the gisted document. In the case where the source and target languages are not entirely similar or dissimilar, the insertion of a phonetic or transliterated string may help the user better understand the gisted document and, thus, would be inserted in the gisted document.

While the step of converting words or phrases in a piece of a document into equivalent words or phrases in a target language in a gisted document (step 506) has been described as including the step of determining the equivalent word(s) or phrase(s) in the target language of the word or phrase in the piece of the document using a source language to target language database, one of ordinary skill in the art will appreciate that many other language processing techniques can be used to determine the equivalent word(s) or phrase(s) in the target language of the word or phrase in the piece of the document. These techniques include pattern recognition, part-of-speech tagging, lexical lookup, morphological analysis, syntactic analysis, semantic analysis, and statistical methods.

Figure 9:
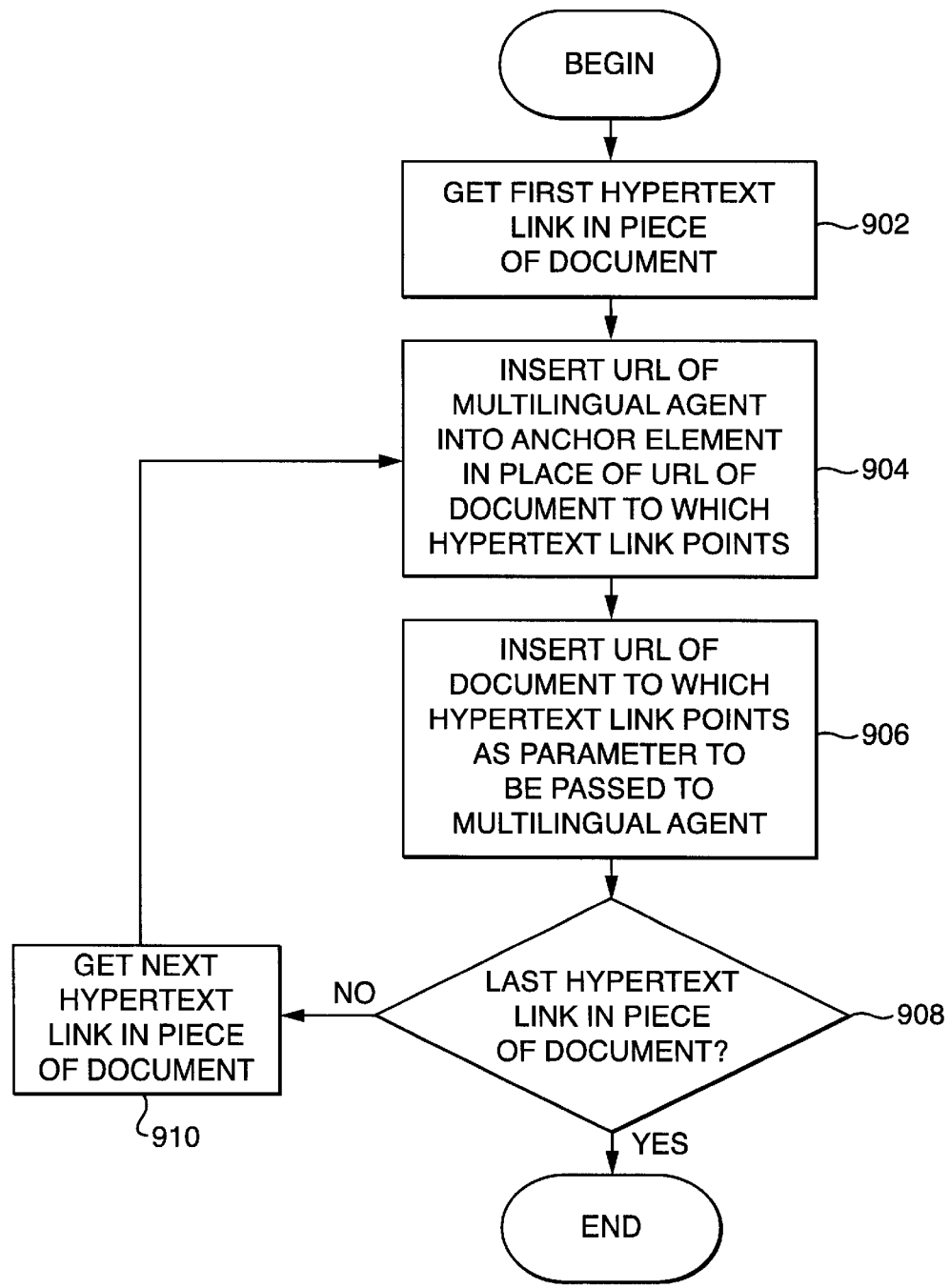
FIG. 9 is a flowchart illustrating in greater detail the preferred step of modifying hypertext links in a piece of a document, as generally illustrated in FIG. 5.

FIG. 9 illustrates the preferred step of modifying hypertext links in a piece of a document (step 508) in greater detail. As described above, HTML documents include anchor elements to indicate hypertext links in the documents. Each anchor element includes the URL of the document to which the hypertext link points and the hypertext anchor. Generally, the link modifier 36 modifies the URL of the document specified in the anchor element so that the hypertext link points to the multilingual agent 26, instead of to the document. The URL of the document is then passed as a parameter to the multilingual agent 26. Further, a base element including the URL of the document being gisted is added to the gisted document. An HTML document includes a base element to indicate the original location of a document when the document is moved.

Starting with a first hypertext link in a piece of the document (step 902), the link modifier 36 inserts the URL of the multilingual agent 26 into the anchor element in place of the URL of the document to which the hypertext link points (step 904). The link modifier 36 then inserts the URL of the document to which the hypertext links points as a parameter to be passed to the multilingual agent 26 (step 906). These steps are repeated for each hypertext link in the piece of the document (steps 908–910). This process is repeated for each piece of the document. Additionally, the link modifier 36 inserts a base element including the URL of the document being gisted into the gisted document.

As a result of modifying the hypertext links in the document, when the user of the client 22 selects a hypertext link, the multilingual agent 26 is called and is passed the URL of the document to which the hypertext link originally pointed (instead of the document to which the hypertext link originally pointed being retrieved). The multilingual agent 26 then retrieves the document to which the hypertext link originally pointed, gists the document, and provides the client 22 with the gisted document. This process occurs automatically once the multilingual agent 26 is running. Therefore, as the user of the client 22 follows hypertext links in documents, each new document is gisted and the client is provided with the gisted document (instead of the original document).

FIGS. 10–13 further illustrate the operation of one aspect of the multilingual agent 26 of the present invention. FIGS. 10 and 12 show documents that the client 22 retrieved from the server 24. The document in FIG. 10 is written in Japanese and the document in FIG. 12 is written in French. FIGS. 11 and 13 show the gisted documents after operation of the multilingual agent 26. Both FIGS. 11 and 13 have been gisted into English. As can be seen from the figures, the gisted documents enable the user of the client 22 to understand the documents well enough to determine whether to follow the hypertext links in the documents.

FIGS. 11 and 13 illustrate a preferred format for the gisted document. As can be seen from the figures, the gisted document is separated into sections with each section corresponding to a different piece of the original document. For each piece of the original document, the corresponding section of the gisted document includes the words or phrases in the piece of the original document followed by an indication of the language in which that piece of the document is written and the equivalent words or phrases in the target language of the words or phrases in the piece of the original document. If the language in which a piece of a document is written is the same as the language in which the previous piece of the document is written, the indication of the language in which the piece of the document is written could be omitted (as shown in the figures). Within each section of the gisted document, the format of the piece of the original document is used. As a result, to the extent possible, the format of the gisted document follows the format of the original document and, thus, preserves the intended presentation of the original document.

If there is more than one equivalent word or phrase in the target language for a word or phrase in a piece of the original document, the equivalent words or phrases are displayed in parentheses to indicate that they are all equivalents of one word or phrase in the piece of the original document. Conversely, if there is no equivalent word or phrase in the target language for a word or phrase in a piece of the original document, an indication of the omission of an equivalent word or phrase is displayed in place of the equivalent word or phrase (as described above in connection with FIG. 8).

Additionally, while not shown in the figures, the equivalent words or phrases in the target language for words or phrases in a hypertext anchor in the original document could be displayed in the hypertext anchor in the gisted document. As a result, the user could select either the original words or phrases in the hypertext anchor or the equivalent words or phrases in the hypertext anchor and the browser would retrieve the document at the address specified in the anchor element.

Figure 14:
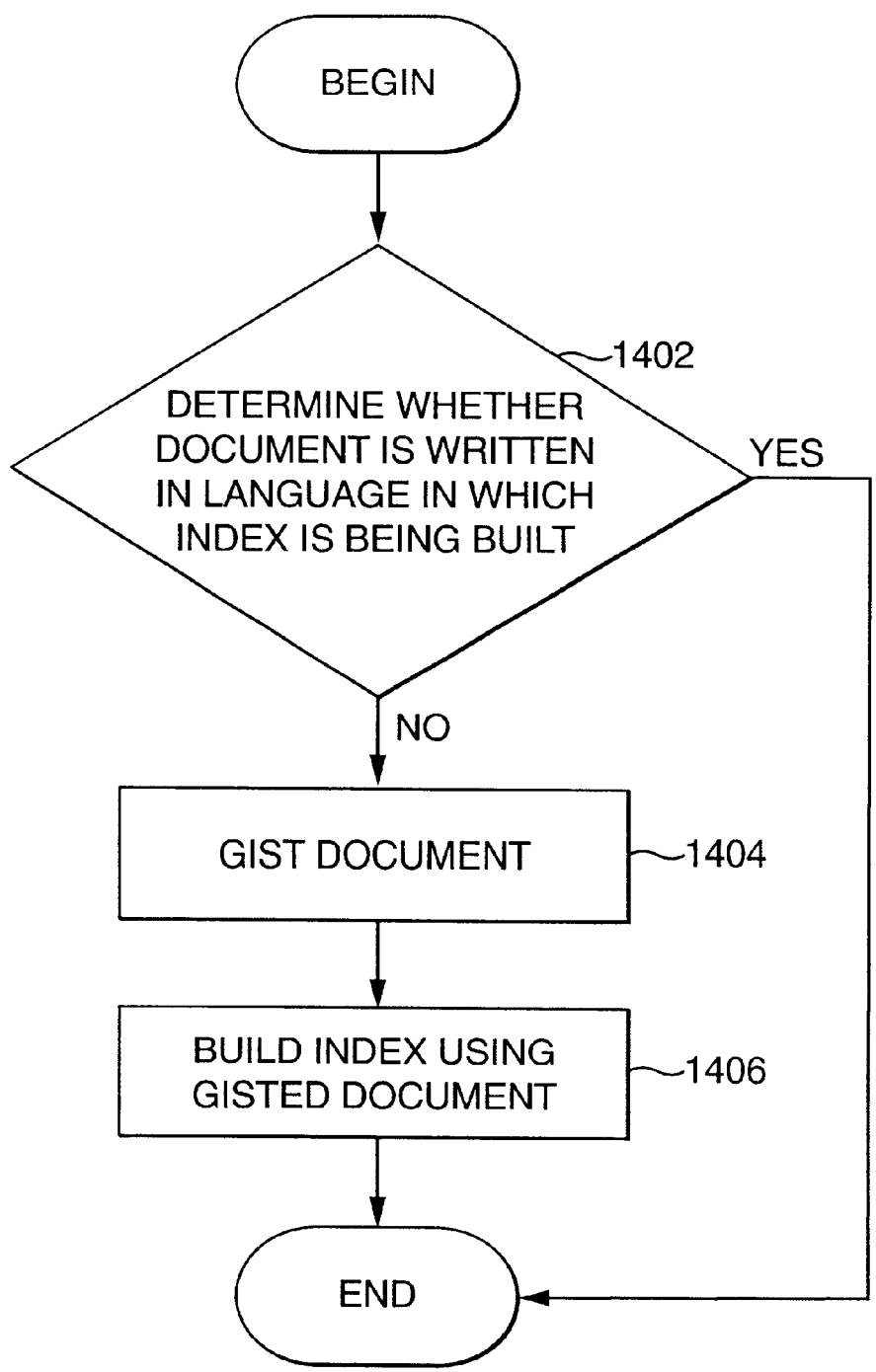
FIG. 14 is a flowchart generally illustrating the preferred steps performed in indexing a document using the multilingual agent of FIG. 3.
Figure 15:
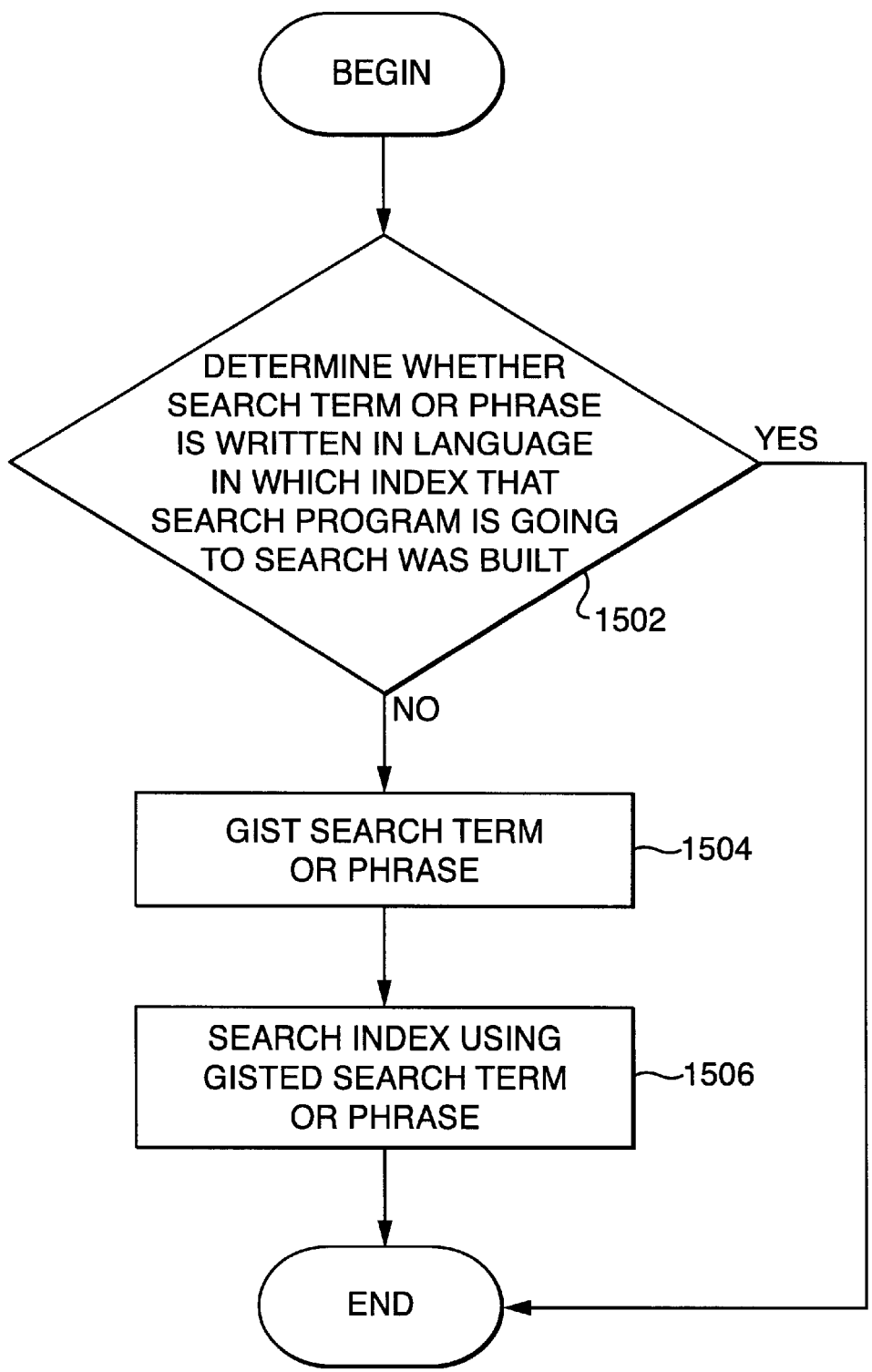
FIG. 15 is a flowchart generally illustrating the preferred steps performed in searching for a document using the multilingual agent of FIG. 3.

As described above, other aspects of the multilingual agent of the present invention assist clients and users of clients in locating and accessing documents on servers and also assist servers and providers of servers in making documents on the servers available to clients and users of clients, regardless of the languages in which the documents are written. FIGS. 14 and 15 generally illustrate the preferred steps performed in the operation of these aspects of the multilingual agent 26 of the present invention.

A variety of programs have been developed that enable users of clients to locate and access documents on servers that are part of the World Wide Web. These programs: (1) retrieve documents on servers that are part of the World Wide Web, (2) index the retrieved documents, and (3) allow users of clients to search for the indexed documents using search terms provided by the users of the clients.

FIG. 14 generally illustrates the preferred steps performed in indexing a document using the multilingual agent 26 of the present invention. Initially, when an index program retrieves a document from a server, such as the server 24, the multilingual agent 26 determines whether the document is written in the language in which the index is being built (step 1402). If the document is not written in the language in which the index is being built, the multilingual agent 26 gists the document (step 1404). The index program then builds the index using the gisted document (step 1406). The step of gisting a document was described in detail above.

FIG. 15 generally illustrates the preferred steps performed in searching for a document using the multilingual agent 26 of the present invention. Initially, when the user of a client, such as the client 22, provides a search program with a search term or phrase, the multilingual agent 26 determines whether the search term or phrase is written in the language in which the index that the search program is going to search was built (step 1502). If the search term or phrase is not written in the language in which the index that the search program is going to search was built, the multilingual agent 26 gists the search term or phrase (step 1504). The search program then searches the index using the gisted search term or phrase (step 1506). After the search program locates any documents that satisfy the search term or phrase provided by the user of the client 22, the multilingual agent 26 determines whether any of the documents are written in a language that is unfamiliar to the user of the client and, if so, gists the documents. Again, the step of gisting a document (or text such as a search term or phrase) was described in detail above.

In a preferred embodiment of the present invention, when the user of the client 22 provides the search program with a search term or phrase, the multilingual agent 26 determines whether the search term or phrase is written in the language in which the index that the search program is going to search was built and, if not, gists the search term or phrase (as generally described above in connection with FIG. 15). In another embodiment of the present invention, the user of the client 22 initiates the multilingual agent 26 when the user of the client wants to provide the search program with a search term or phrase that is not written in the language in which the index that the search program is going to search was built.

One of ordinary skill in the art will now appreciate that the preferred embodiment of the present invention provides a multilingual agent for use in computer systems. The multilingual agent assists clients and users of clients in locating, accessing, and understanding documents on servers, regardless of the languages in which the documents are written. The multilingual agent also assists servers and providers of servers in making documents on the servers available to clients and users of clients, again, regardless of the languages in which the documents are written.

Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A method executed in a computer system for providing multilingual assistance, the method comprising the steps of:
   receiving text;
   wherein the text includes links pointing to other text,
   breaking the text into pieces, wherein the pieces comprise at least one piece;
   modifying the links in the at least one piece of the text;
   wherein each link includes an address of the text to which the link points;
   for each link in the at least one piece of the text,
   inserting an address of a multilingual agent in the link in place of the address of the text to which the link points;
   inserting the address of the text to which the link points as a parameter to be passed to the multilingual agent;
   identifying a source language in which the at least one piece of the text is written; and
   converting words or phrases in the at least one piece of the text into equivalent words or phrases in a target language.

2. A computer program product for providing multilingual assistance, the computer program product comprising:
   computer readable program code configured to receive text;
   wherein the text includes links pointing to other text,
   computer readable program code configured to break the text into pieces, wherein the pieces comprise at least one piece;
   computer readable program code configured to modify the links in the at least one piece of the text;
   wherein each link includes an address of the text to which the link points;
   computer readable program code configured to, for each link in the at least one piece of the text,
   insert an address of a multilingual agent in the link in place of the address of the text to which the link points;
   insert the address of the text to which the link points as a parameter to be passed to the multilingual agent;
   computer readable program code configured to identify a source language in which the at least one piece of the text is written;
   computer readable program code configured to convert words or phrases in the at least one piece of the text into equivalent words or phrases in a target language; and
   a computer readable medium in which the computer readable program codes are stored.

3. A system for providing multilingual assistance, the system comprising:
   a computer configured to control the operation of the system;
   a secondary storage device connected to said computer;
   a multilingual agent stored in said secondary storage device and executed by said computer;
   said multilingual agent being configured to receive text, wherein the text includes links pointing to other text;
   a document analyzer configured to break the text into pieces, wherein the pieces comprise at least one piece;
   a link modifier configured to modify the links in the at least one piece of the text;
   wherein each link includes an address of the text to which the link points;
   for each link in the at least one piece of the text,
   insert an address of said multilingual agent in the link in place of the address of the text to which the link points;
   insert the address of the text to which the link points as a parameter to be passed to said multilingual agent;
   a language identifier configured to identify a source language in which the at least one piece of the text is written; and
   a language converter configured to convert words or phrases in the at least one piece of the text into equivalent words or phrases in a target language.

* * * * *